United States Patent [19]
Pfeiffer

[11] 3,852,012
[45] Dec. 3, 1974

[54] CONTINUOUSLY OPERATING PANEL PRESS

[75] Inventor: Heinrich Pfeiffer, Berliner Ring, Germany

[73] Assignee: Maschinenfabrik J. Dieffenbacher & Co., Eppingen, Germany

[22] Filed: Aug. 28, 1973

[21] Appl. No.: 392,232

[30] Foreign Application Priority Data
Aug. 29, 1972 Germany............................ 2242492

[52] U.S. Cl.................. 425/363, 425/367, 425/335
[51] Int. Cl........................ B29d 7/14, B29c 15/00
[58] Field of Search .......... 425/363, 367, 371, 372, 425/394, 335, 450 C; 74/242.8

[56] References Cited
UNITED STATES PATENTS

| | | | |
|---|---|---|---|
| 2,178,121 | 10/1939 | Lockhart ............................ | 425/367 |
| 2,179,961 | 11/1939 | Schnuck ............................ | 425/367 |
| 3,313,010 | 4/1967 | Betz................................. | 425/371 X |
| 3,422,178 | 1/1969 | Junker et al..................... | 425/371 X |

*Primary Examiner*—Robert L. Spicer, Jr.
*Attorney, Agent, or Firm*—Joseph A. Geiger

[57] ABSTRACT

A continuously operating press for the fabrication of pressed panels in which the press frame carries the upper and lower press spars on cantilever supports so as to give easy access to the conveyors and other maintenance-requiring machine part for convenient removal and replacement.

8 Claims, 3 Drawing Figures

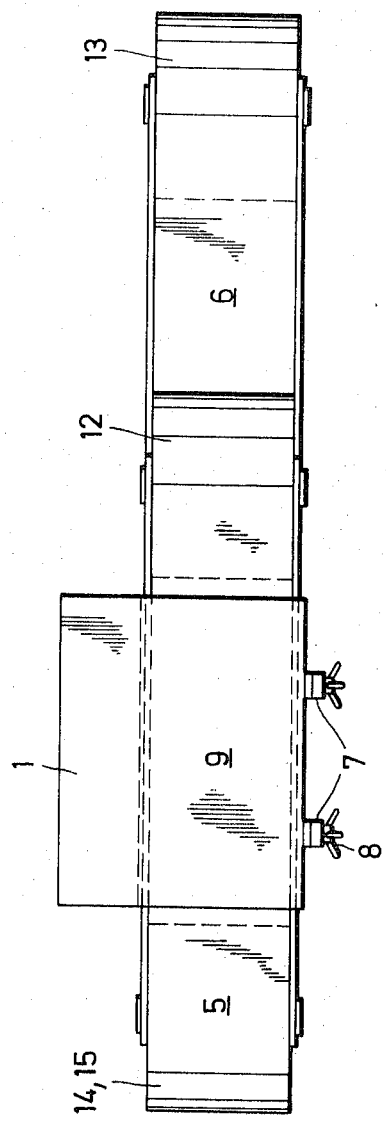

CONTINUOUSLY OPERATING PANEL PRESS

BACKGROUND OF THE INVENTION

1. Field of the Invention

The present invention relates to presses for the production of panels of pressed chips, pressed fibers, or plywood and the like, and in particular to presses where the material to be worked is conveyed continuously through the press by means of endless conveyor bands, plate chains, or roller chains which are guided over drive rollers and idler rollers mounted on the stationary spar and movable spar of the press.

2. Description of the Prior Art

The generally preferred conveying means for this type of press in an endless, flexible steel band. However, these steel bands are subject to rapid wear and frequent replacement. In the past, the removal and replacement of these steel conveyor bands has been a source of considerable downtime, and hence a cause of increased costs.

In prior art presses it was necessary to remove damaged or otherwise inoperative conveyor bands by cutting them before removal from the press. A new band, consisting of a given length of steel strip, would then be inserted into the machine, whereupon the ends of the strip would be welded together on the machine itself. This in-place welding operation brings with it the risk of misalignment of the two strip ends after welding, with the consequent problem of irregular run over the guide rollers. Finally, the welded ends had to be ground smooth and dressed in place to the extent possible. Obviously, the preparation for this welding operation, as well as the in-place welding and grinding require considerable time for preparation and installation, not to mention the need for having highly skilled specialists perform these tasks.

Similarly, in the case of conveyor systems where the steel band glides against stationary supports, the maintenance and occasional replacement of the support liners on the press spars amounts to complex and costly maintenance operations. Lastly, it is sometimes also necessary to replace the heater pads, a similarly difficult and time-consuming operation.

Thus, the prior art panel presses which have been known heretofore are subject to considerable downtime as a result of these complicated maintenance procedures, a fact which obviously diminishes the productivity of these machines. No adequate solution to the wear problem of the critical elements mentioned has been discovered as yet.

SUMMARY OF THE INVENTION

It is a primary objective of the present invention to overcome the above-mentioned prior art shortcomings, by suggesting a continuously operating panel press where any damaged conveyor elements, heater pads, support liners, and similar wearing components can be quickly and easily removed for maintenance or replacement.

In order to attain the above objective, the present invention suggests a novel continuously operating panel press where the press frame is of the open type and the two press spars are arranged in cantilever fashion on the press frame, an upper cantilever support and a lower cantilever support carrying the conveyors and other maintenance-requiring elements in such way that they are easily accessible from the side opposite the press frame. For greater rigidity, the forward ends of the upper and lower cantilever supports are linked together by vertical tie members which can be removed quickly for access to the critical parts. The arrangement of the conveyor assemblies with their steel bands, plate chains or roller chains, is conventional in that the return strands of the upper and lower conveyor units pass above and below the movable and stationary press spars, respectively.

A preferred embodiment of the invention has a press frame in the shape of an "E," the upper two bars of the "E" representing the upper and lower cantilever supports, and the bottom bar representing the machine base with which the press rests on its foundation.

Thus, the present invention makes it possible to have access to the critical machine elements by simply removing the vertical tie members, whereupon the heater pads and the conveyor element (endless steel bands, plate chains, roller chains) can be pulled from the machine in a most simple procedure. A major advantage of this arrangement resides in the fact that it is now possible to use finished, endless conveyor elements which are produced elsewhere at less cost and with greater precision, thereby realizing savings in spare parts as well in maintenance labor, since the replacement of finished drive elements can be performed by non-skilled or semi-skilled labor.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows:

FIG. 3 is a plan view of the panel press of FIG. 1.

DESCRIPTION OF THE PREFERRED EMBODIMENT

Figure 1:
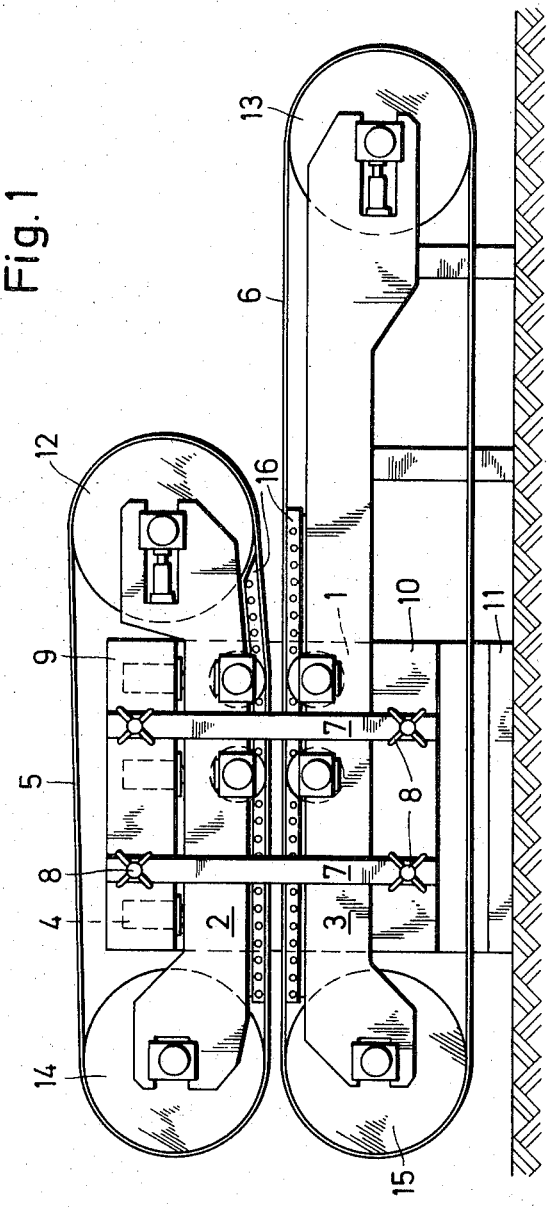
FIG. 1 shows in a schematic elevational view a panel press embodying the invention.
Figure 2:
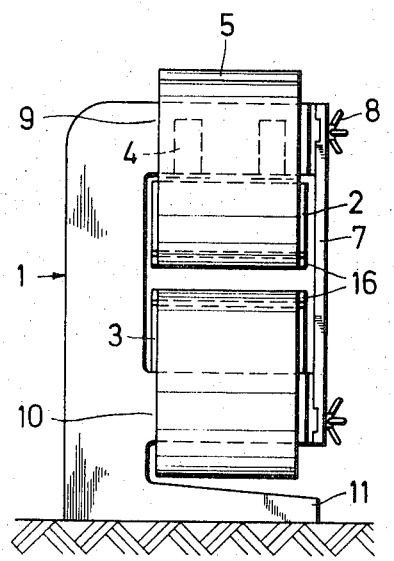
FIG. 2 is a side view of the panel press of FIG. 1.

FIGS. 1 to 3 illustrate, in a somewhat schematic representation, a continuously operating panel press for the production of panels out of wood chips, fibers, plywood, and the like.

As can be seen from the figures, the press includes a central press frame 1, which carries an upper movable press spar 2 and a lower stationary press spar 3, the spars 2 and 3 facing one another on opposite sides of the work gap of the press. Each of the two press spars carries a complete conveyor assembly consisting essentially of two or more drums over which the endless conveyor elements are guided. Thus, the conveyor assembly which moves with the movable press spar carries a drum 14 and a drum 12 and, in the case of the embodiment as illustrated, a steel conveyor band 5. Similarly, the stationary conveyor assembly consists essentially of a drum 15, a drum 13, and a steel conveyor band 6. The lower conveyor, since it is stationary and also serves as a carrying conveyor, is longer than the upper conveyor assembly which is mounted on the movable spar 2.

Each spar also carries a heater pad 16. The work gap between the conveyor bands can be controlled through several hydraulic pressure cylinders 4, by means of which the movable press spar 2 is movable vertically in relation to the stationary press spar 3.

The central press frame, when viewed from the side, has the shape of an "E," the upper two bars of the "E" representing the upper cantilever support 9 carrying the movable press spar 2, and the lower cantilever support 10 carrying the stationary press spar 3. The bottom bar of the "E" is the machine base 11, which thus supports the press directly underneath its center of gravity.

The two cantilever supports 9 and 10 are in addition linked together at their outer ends by means of vertical tie members 7, thereby forming a rigid connection between them. These tie members 7 can be quickly removed from the machine by unscrewing the wing nuts 8 so that full access to the maintenance-requiring machine elements is given.

For instance, replacement of a conveyor band is now a very simple operation: after loosening the adjustable drum 12 the steel band 5 can be withdrawn laterally from the conveyor and a new steel band can be slipped over the drums 14 and 12, whereupon the adjustable drum 12 is re-tensioned. A similarly simple replacement procedure is now possible with the heater pad 16. Following replacement of these elements, the tie members 7 are re-installed on the cantilever supports, and the machine is ready for operation.

It should be understood, of course, that the foregoing disclosure describes only a preferred embodiment of the invention and that it is intended to cover all changes and modifications of this example of the invention which fall within the scope of the appended claims.

I claim:

1. A continuously operating press for the fabrication of panels of chips, fibers, plywood and the like, comprising in combination:

an open machine frame which includes a base portion, an upper support member and a lower support member, both arranged at a vertical distance from one another and from the base portion;

a movable press spar and a stationary press spar facing one another vertically on opposite sides of a horizontal work gap between the support members; one of the spars being mounted underneath the upper support member, the other one being mounted above the lower support member;

means for vertically adjusting the movable press spar; and an upper conveyor supported by the spar mounted on the upper support member, and a lower conveyor supported by the spar mounted on the lower support member; and wherein:

each conveyor includes an endless conveying element, and conveyor drive means; and the upper conveying element has an outer return strand running above the upper support member and an inner working strand forming the upper side of the work gap, while the lower conveying element has an outer return strand running below the lower support member and an inner working strand forming the lower side of the work gap, both endless conveying elements being removable from their guide drums by laterally sliding them over their respective support members and press spars.

2. A panel press as defined in claim 1, wherein:

the machine frame further includes a substantially upright back portion which extends upwardly from the base portion; and the upper and lower support members are in the form of cantilever supports extending horizontally and in parallel to one another from the back portion of the frame.

3. A panel press as defined in claim 2, wherein:

the base portion of the machine frame is positioned directly underneath the cantilever support members, so that the machine frame has an overall outline in the shape of an "E."

4. A panel press as defined in claim 2, further comprising:

at least one generally vertical, easily removable tie member arranged at the open side of the machine frame so as to connect the ends of the cantilever support members, thereby securing them against deflection during press operation.

5. A panel press as defined in claim 4, wherein:

two vertical tie members are arranged in parallel and attached to the cantilever support members by means of studs and wing nuts.

6. A panel press as defined in claim 1, wherein:

the endless conveying elements of the conveyors are steel bands.

7. A panel press as defined in claim 1, wherein:

the movable press spar is mounted from underneath to the upper support member; and the vertical adjusting means includes a plurality of hydraulic cylinders arranged between the upper support member and the movable press spar.

8. A panel press as defined in claim 1, further comprising:

stationary heater pads arranged above and below the work gap immediately behind the inner working strands of the upper and lower conveying elements, the heater pads being readily removable and insertable in a lateral direction relative to the conveyors.

* * * * *